United States Patent [19]

Schober

[11] 3,873,995

[45] Mar. 25, 1975

[54] MAGNETIC SHIELDING MOTOR MOUNT

[75] Inventor: Wayne E. Schober, Minneapolis, Minn.

[73] Assignee: Telex Communications, Inc., Minneapolis, Minn.

[22] Filed: May 29, 1973

[21] Appl. No.: 364,744

[52] U.S. Cl. .................................. 360/137, 248/16
[51] Int. Cl. .... G11b 5/00, H02k 5/26, F16m 11/08
[58] Field of Search ........................ 360/137, 90–96; 274/1 E, 39 A; 248/2, 16, 17; 310/66, 85, 86, 89, 103, 104

[56] References Cited

UNITED STATES PATENTS 2,673,059 3/1954 Lustig .................................. 248/16
2,717,281 9/1955 Bauman ............................ 360/137

*Primary Examiner*—Raymond F. Cardillo, Jr.
*Attorney, Agent, or Firm*—Warren A. Sturm

[57] ABSTRACT

An adjustable motor mount for tape decks having a first semi-cylindrical shielding member mounted on the chassis to rotatably receive a motor, and a second shielding member comprised of spring type material extending outside of the first shielding member and into engagement with the outside of the motor. The multiple layered shielding provided by the shielding members combines with the radial adjustment of the motor for minimum transfer of magnetic energy to the tape head to substantially eliminate the problem of magnetic interference.

4 Claims, 4 Drawing Figures

PATENTED MAR 25 1975

3,873,995

MAGNETIC SHIELDING MOTOR MOUNT

BACKGROUND OF THE INVENTION

This invention is concerned with elimination of the effects of stray magnetic fields in a tape deck of the class used to play tape cartridges or tape cassettes wherein electric motors are used to drive a capstan and may normally be disposed in proximity to a tape head. In the past apparatus, many attempts have been made to provide shielding by merely placing quantities of material exhibiting properties for magnetic shielding between the source of stray magnetic energy and the tape head. This becomes increasingly difficult as the size of tape handling equipment is reduced as, for example, in the automotive tape player.

SUMMARY OF THE INVENTION

The present invention pertains to an improved combined mount and shield for a motor in a tape handling device. It has been observed that the magnetic field of an electric motor may have a preferred axis and will therefore appear stronger at certain locations with respect to the motor than in others. In my invention, a semicircular shielding member is utilized to be disposed between a motor and the tape head in a tape deck and a substantially cylindrical clamp, also formed of magnetic shielding material is disposed over the semicircular shield and the motor so as to allow the motor to be rotated within for a position which will reduce the effects of the magnetic field from the motor to a minimum.

It is an object of the present invention to provide an improved shielding device for use in a magnetic tape player employing the magnetic heads.

It is a still further object of my invention to provide a combined magnetic shield and mount for the motor in a tape playing machine.

These and other objects of my invention will become apparent to those skilled in the art upon consideration of the appended specification, claims and drawings.

DESCRIPTION OF THE PREFERRED EMBODIMENT

Figure 1:
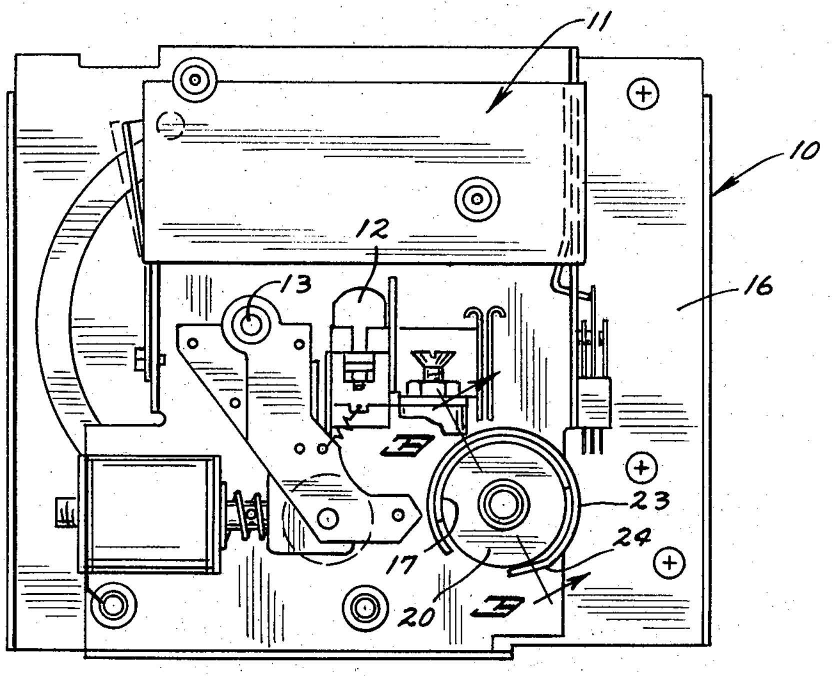
FIG. 1 is a top plan view of the principal elements of a tape cartridge playing apparatus embodying the principles of my invention.
Figure 2:
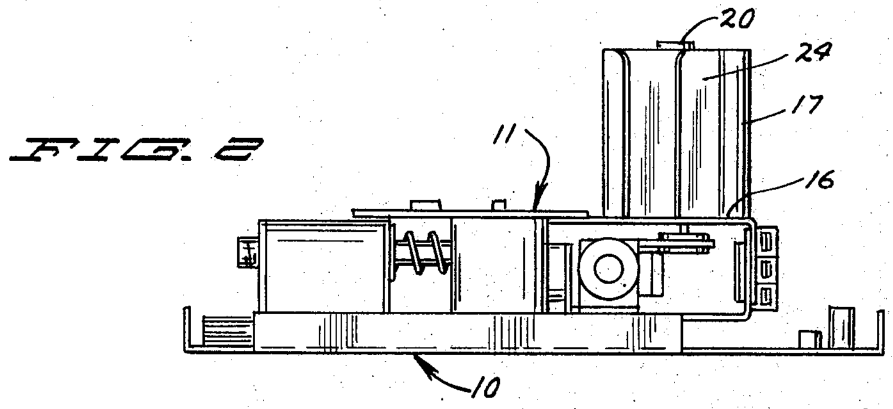
FIG. 2 is a rear elevation view of the apparatus of FIG. 1.
Figure 3:
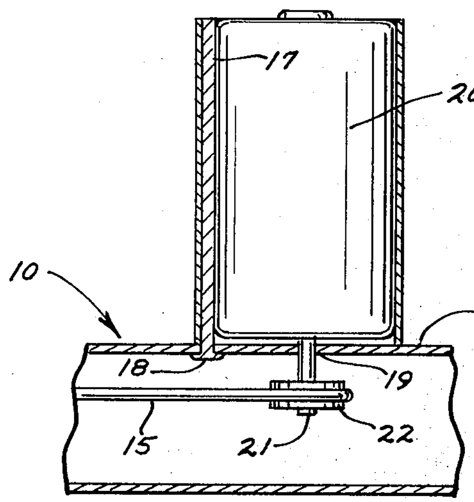
FIG. 3 is a sectional view of a portion of the apparatus shown in FIG. 1 taken along section line 3—3.
Figure 4:
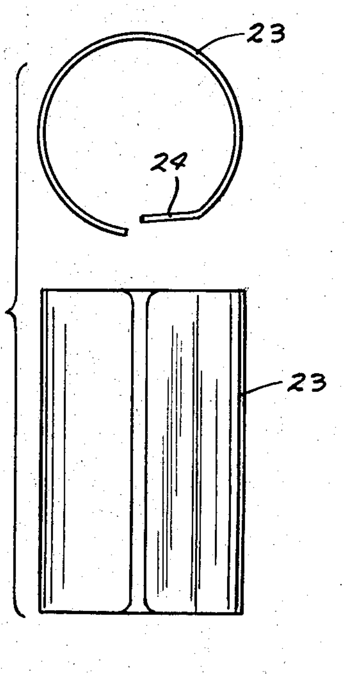
FIG. 4 is a composite top and side elevational view of a portion of the apparatus of my invention.

Referring to FIGS. 1–4 of the drawing wherein like reference characters have been applied to like elements, there is shown a tape deck 10 which may be of the type commonly used in automobiles. Tape deck 10 includes elements common to all forms of tape cartridge playing apparatus, a cartridge receiver 11 in which a tape cartridge may be slidably disposed in proximity to a tape head 12 and a capstan 13. Capstan 13 is provided with a drive pulley 14 around which is positioned one end of a belt 15 in a peripheral groove (not shown).

Tape deck 10 also includes a top chassis 16 upon which is disposed a vertical semicylindrical shielding and mounting means 17 that may be attached thereto by staking in appropriate aperatures formed in the chassis as indicated by reference character 18. Mounting shield 17 is disposed adjacent an aperature 19 in the chassis. A motor 20 is shown having a shaft 21 upon which a pulley 22 is disposed. Pulley 22 is also in driving engagement with belt 15 and when motor 20 is energized from a suitable source of electrical energy, serves to drive capstan pulley 14 and capstan 13 at the desired speed.

It will be seen that motor 20 is disposed adjacent mounting shield 17 and is held thereon by a motor grip 23 which is provided within an elongated flattened portion 24 which serves to engage and retain a motor in predetermined relationship with mounting shield 17 in the position indicated in the top view of FIG. 1 of the drawings.

Mounting shield 17 and motor mount 23 are preferably formed of material exhibiting substantial magnetic shielding properties, however, the motor mounting element 23 must also exhibit spring characteristics so as to provide a suitable grip to maintain motor 20 and any predetermined orientation.

As may be seen on FIG. 1 of the drawings, tape head 12 is in a position whereat it may be subjected to the magnetic field surrounding motor 20. In order to properly utilize all of the advantages of my improved shielding mount, the output of tape head 12 may be observed while motor 20 is rotated within motor mount 23 for a minimum transfer of magnetic energy. It has also been observed that the multiple layered effect of mounting shield 17 and motor mount 23 provides a substantial improvement in shielding over that which would be experienced from a single layer of material of like thickness.

Having now therefore fully illustrated and described my invention, what I claim to be new and desire to protect by Letters Patent is:

1. An adjustable motor mount for a tape deck having a chassis, a capstan, a cartridge receiver and a tape head, comprising:

- an arcuate shield member mounted on said chassis intermediate the tape head and an aperture in the chassis for receiving the shaft of a drive motor;
- motor means rotatably disposed on the shield member and having a drive shaft extending through the aperture in said chassis; and
- spring means disposed around the outside of said shield member and said motor means and having one portion thereof in engagement with said shield member and another portion thereof in engagement with said motor.

2. The subject matter of claim 1 in which the spring means is comprised of shielding material.

3. The subject matter of claim 1 in which the shield member is semi-cylindrical in shape.

4. The apparatus of claim 1 in which the shield member is substantially thicker than the spring member.

* * * * *